US008147741B2

(12) United States Patent
Malle et al.

(10) Patent No.: US 8,147,741 B2
(45) Date of Patent: Apr. 3, 2012

(54) METHOD AND MANUFACTURING A GLASS FIBER REINFORCED ARTICLE, AND A GLASS FIBER REINFORCED ARTICLE

(75) Inventors: Edward M. Malle, Little Rock, AR (US); Jay J. Hood, Commerce, OK (US)

(73) Assignee: Vec Industries, L.L.C., Minneapolis, MN (US)

( * ) Notice: Subject to any disclaimer, the term of this patent is extended or adjusted under 35 U.S.C. 154(b) by 0 days.

(21) Appl. No.: 13/012,232

(22) Filed: Jan. 24, 2011

(65) Prior Publication Data

US 2011/0115113 A1 May 19, 2011

Related U.S. Application Data

(62) Division of application No. 12/658,981, filed on Feb. 17, 2010, now Pat. No. 7,875,225, which is a division of application No. 11/770,866, filed on Jun. 29, 2007, now Pat. No. 7,691,311.

(60) Provisional application No. 61/007,921, filed on Apr. 27, 2007.

(51) Int. Cl.
*B29C 45/14* (2006.01)
(52) U.S. Cl. ...... 264/255; 264/257; 264/309; 264/328.6
(58) Field of Classification Search .................. 264/255, 264/257, 309, 328.6
See application file for complete search history.

(56) References Cited

U.S. PATENT DOCUMENTS

| | | | |
|---|---|---|---|
| 3,660,184 A | 5/1972 | Burelle et al. | |
| 4,673,594 A | 6/1987 | Smith | |
| 4,762,740 A | 8/1988 | Johnson et al. | |
| 4,882,114 A | 11/1989 | Radvan et al. | |
| 5,034,181 A | 7/1991 | Billiu | |
| 5,045,251 A | 9/1991 | Johnson | |
| 5,093,059 A | 3/1992 | Nathoo et al. | |
| 5,123,949 A | 6/1992 | Thiessen | |
| 5,296,544 A | 3/1994 | Heise et al. | |
| 5,296,545 A | 3/1994 | Heise | |
| 5,320,870 A | 6/1994 | Sorathia et al. | |
| 5,413,750 A | 5/1995 | Kelman et al. | |

(Continued)

FOREIGN PATENT DOCUMENTS

GB 2 015 915 A 9/1979

OTHER PUBLICATIONS

Material Safety Data Sheet, NUTACK 046-4065.

(Continued)

*Primary Examiner* — Joseph Del Sole
*Assistant Examiner* — James Sanders
(74) *Attorney, Agent, or Firm* — Merchant & Gould, P.C.

(57) ABSTRACT

A glass fiber reinforced article can be manufactured by: applying a mixture of glass fiber and binder over a mold surface of a first mold section to form a glass fiber matrix, wherein the binder comprises an organic solvent based binder capable of holding the glass fiber in place at room temperature; closing a second mold section over the first mold section to form a plenum between the first mold section and the second mold section, wherein the glass fiber matrix is provided in the plenum between the first mold section and the second mold section; injecting a reactive polymer forming composition into the plenum; and allowing the reactive polymer forming composition to react and form a thermoset resin. A glass fiber reinforced article is provided according to the invention.

18 Claims, 5 Drawing Sheets

U.S. PATENT DOCUMENTS

| | | | |
|---|---|---|---|
| 5,523,135 | A | 6/1996 | Shiwaku et al. |
| 5,554,687 | A | 9/1996 | Yang |
| 5,579,998 | A | 12/1996 | Hall et al. |
| 5,664,518 | A | 9/1997 | Lewit et al. |
| 5,739,232 | A | 4/1998 | Hazell et al. |
| 5,851,667 | A | 12/1998 | Yang et al. |
| 5,971,742 | A | 10/1999 | McCollum et al. |
| 6,015,519 | A | 1/2000 | Lapikas et al. |
| 6,030,575 | A | 2/2000 | Barron et al. |
| 6,136,883 | A | 10/2000 | Yang et al. |
| 6,143,215 | A | 11/2000 | McCollum et al. |
| 6,211,305 | B1 | 4/2001 | Hsu et al. |
| 6,225,380 | B1 | 5/2001 | Pezron et al. |
| 6,257,867 | B1 | 7/2001 | McCollum et al. |
| 6,287,493 | B1 | 9/2001 | McCollum et al. |
| 6,367,406 | B1 | 4/2002 | Sahr et al. |
| 6,380,278 | B1 | 4/2002 | Fan et al. |
| 6,492,470 | B2 | 12/2002 | Crump et al. |
| 6,582,773 | B2 | 6/2003 | Brynolf |
| 6,623,672 | B2 | 9/2003 | McCollum et al. |
| 6,660,373 | B2 | 12/2003 | Hsu et al. |
| 6,830,804 | B2 | 12/2004 | Hsu et al. |
| 6,900,276 | B2 | 5/2005 | Crump et al. |
| 6,923,635 | B2 | 8/2005 | Burgess |
| 6,994,051 | B2 | 2/2006 | Sahr et al. |
| 7,156,043 | B2 | 1/2007 | Sahr et al. |
| 2002/0018860 | A1 | 2/2002 | Filippou et al. |
| 2002/0049565 | A1 | 4/2002 | Kirila |
| 2002/0145217 | A1 | 10/2002 | Boyd et al. |
| 2004/0145092 | A1 | 7/2004 | McCollum et al. |
| 2004/0145093 | A1 | 7/2004 | McCollum |
| 2004/0145094 | A1 | 7/2004 | McCollum |
| 2004/0145095 | A1 | 7/2004 | McCollum |
| 2004/0146714 | A1 | 7/2004 | McCollum |
| 2004/0265568 | A1 | 12/2004 | Crane |
| 2005/0161861 | A1 | 7/2005 | Lammers et al. |
| 2005/0184416 | A1 | 8/2005 | McCollum |
| 2006/0163772 | A1 | 7/2006 | Lammers et al. |
| 2007/0036969 | A1 | 2/2007 | Magnin et al. |

OTHER PUBLICATIONS

Material Safety Data Sheet, COR99-216-020.

P4 Technology, Owens Corning, Publication No. 5-PL-22221, Feb. 1998 (6 pages).

International Search Report and Written Opinion for International Application No. PCT/US08/61290, dated Jul. 22, 2008.

International Search Report and Written Opinion for International Application No. PCT/US08/61290, dated Apr. 23, 2008.

METHOD AND MANUFACTURING A GLASS FIBER REINFORCED ARTICLE, AND A GLASS FIBER REINFORCED ARTICLE

CROSS REFERENCE TO RELATED APPLICATIONS

This application is a divisional of U.S. application Ser. No. 12/658,981, which was filed on Feb. 17, 2010, which is a divisional application of U.S. application Ser. No. 11/770,866, which was filed on Jun. 29, 2007 and which issued as U.S. Pat. No. 7,691,311, and which claims priority to U.S. Provisional Application Ser. No. 61/007,921 which was filed on Apr. 27, 2007. The entire disclosures of U.S. application Ser. Nos. 61/007,921, 11/770,866, and 12/658,981 are incorporated herein by reference.

FIELD OF THE INVENTION

The invention relates to a method for manufacturing a glass fiber reinforced article, and to a glass fiber reinforced article.

BACKGROUND

Composite structures made from fiberglass material impregnated with a cured, thermoset resin are known for manufacturing articles such as spas, tubs, recreational vehicles, auto body panels, and marine components such as boat decks and hulls. The composite structures are sometimes referred to as fiberglass reinforced articles.

Conventional methods for making fiberglass reinforced articles involve manually shaping the glass fiber to a mold surface and then impregnating the glass fiber with a thermoset resin. Two common techniques for fiberglass reinforced article structures comprising a fiberglass reinforced composite material impregnated with a cured, thermoset resin can be referred to as open molding and closed molding.

In both open molding and closed molding techniques, a gel coat of clear or pigmented thermoset resin is typically applied to the surface of a mold before forming a final laminate structure. The gel coat results in a smooth, cosmetically attractive surface for the finished article and protects the fiber composite from attack by ultra violet radiation from the sun. Materials selected for use as a gel coat on the exterior surface of the composite require a combination of desirable properties including outdoor weatherability, impact resistance, attractive cosmetic qualities, and ease of processing. Gel coats are typically applied to the mold surface by spray methods in which the material in thickened liquid form is placed on the mold surface.

During an open molding process, a combination of glass fiber and resin is typically applied over the gel coat. The combination of glass fiber and resin is often applied as a spray through a chopper gun. The fiberglass can be referred to as long strand fiberglass or chopped fiber, and the resin is often a polyester resin containing volatile organic components (VOCs) such as styrene monomer. As the polyester resin cures, the VOCs are released to the environment. Many of these volatile components are classified as hazardous air pollutants that are harmful to human health and the environment. Further, VOCs are often flammable resulting in a fire hazard. Elaborate precautions and expensive equipment can be used to reduce the release of and exposure to these volatile substances. As a result of open molding, however, substantial amounts of VOCs are typically released.

Closed mold processes were developed to reduce the emission of VOCs. Exemplary closed mold processes can be referred to as reaction injection molding and resin transfer molding. Reaction injection molding and resin transfer molding are processes wherein dry fiber reinforcement plys or panels sometimes referred to as engineered glass fiber are loaded in a mold cavity having surfaces that define the ultimate configuration of an article. Using engineered glass fiber requires skill and patience in cutting and trimming the plys or panels and placing them in the mold so that they sufficiently cover the mold cavity. Molds having a curved surface, such as, boat hull molds, typically require the cutting and trimming of the engineered glass fiber to provide complete coverage over the mold surface to avoid open spaces and to avoid overlap. Furthermore, it is often necessary to apply an adhesive to the engineered glass fiber so that it remains in place covering the mold surface. Preforms generally require steps of forming the preform on a screen where the glass fiber cures, and then transferring the preform to the mold An exemplary technique showing the formation of preform is described by GB 2 015 915 A. Once the engineered glass fiber or preform is placed in the mold, a second mold half can be placed over first mold half forming a mold cavity or plenum containing the engineered glass fiber or preform. A flowable resin is injected into the mold cavity or plenum to impregnate or saturate the engineered glass fiber. After a period of curing, the finished article is removed from the mold plenum. An advantage of the closed mold process is that emission can be significantly reduced compared with the open mold process. Compared with chopped fiber however, the engineered glass fiber is typically substantially more expensive. Furthermore, the use of engineered glass fiber is more time consuming and requires more man hours to place within a mold. In addition, the preparation of a preform requires additional time and space in order to allow the preform to cure before the preform is introduced into the mold.

While it is desirable to reduce the emissions associated with the open mold process, it is also desirable to reduce the costs associated with the use of the closed mold process. As a result, alternative processes have been developed. One method disclosed in U.S. Pat. No. 6,030,575 applies a heated binder to fibers already supported on a support surface while a vacuum is applied to the other side of the support surface. By this method, the fibers are held in place by the vacuum while the binder is applied at a high pressure by a spray device. This application applies pressure to the fibers thus forming a solid reinforcing structure. Upon application, and with the assistance of the air flow from the vacuum, the binder cools and solidifies into the desired preform shape. However, the application of the vacuum requires additional equipment in the form of a plenum arrangement and also requires additional control functions and labor to properly apply the fibers and vacuum. Therefore, the material and operating costs are increased. Another technique utilizes an open flame as a heating source to melt the binder mixed with glass fiber that is sprayed onto a mold and, as a result, provides robotics for applying the spray of binder and glass fiber. For example, see U.S. Patent Publication Nos. US 2006/0163772 and US 2005/0161861.

SUMMARY

A method for manufacturing a glass fiber reinforced article is provided a according to the invention. The method includes steps of: applying a mixture of glass fiber and binder over a mold surface of a first mold section to form a glass fiber matrix, wherein the binder comprises an organic solvent based binder capable of holding the glass fiber in place at room temperature; closing a second mold section over the first mold section to form a plenum between the first mold section and the second mold section, wherein the glass fiber matrix is provided in the plenum between the first mold section and the second mold section; injecting a reactive polymer forming composition into the plenum so that the reactive polymer forming composition infuses with the glass fiber matrix; and allowing the reactive polymer forming composition to react and form a thermoset resin. The glass fiber and binder can be applied over a mold surface, and the binder can hold the glass fiber in place without the application of heat to the binder.

An alternative method for manufacturing glass fiber reinforced article is provided according to the invention. The method includes steps of: applying at least one of a gel coating composition or a barrier coating composition over a mold surface of a first mold section to form at least one of a gel coat or a barrier coat; applying a mixture of glass fiber and binder over the at least one of a gel coat or a barrier coat to form a glass fiber matrix, wherein the binder comprises a binder having glass fiber adhesive properties at room temperature and having reactive group that react with a reactive polymer forming composition; closing a second mold section over the first mold section to form a plenum between the first mold section and the second mold section, wherein the at least one of the gel coat or the barrier coat, and the glass fiber matrix are provided in the plenum; injecting a reactive polymer forming composition into the plenum so that the reactive polymer forming composition infuses with the glass fiber matrix; and allowing the reactive polymer forming composition and the binder to react and cure to form a thermoset resin.

A glass fiber reinforced article is provided according to the invention. The glass fiber reinforced article comprises a result of a modified closed mold process where a mixture of glass fiber and binder is applied over a mold surface, wherein the binder comprises a binder having glass fiber adhesive properties at room temperature and having reactive group that reacts with a reactive polymer forming composition, and injecting a reactive polymer forming composition into a mold plenum containing the glass fiber matrix, and allowing the reactive polymer forming composition and the binder to react and cure to form a thermoset resin.

DETAILED DESCRIPTION

Figure 1:
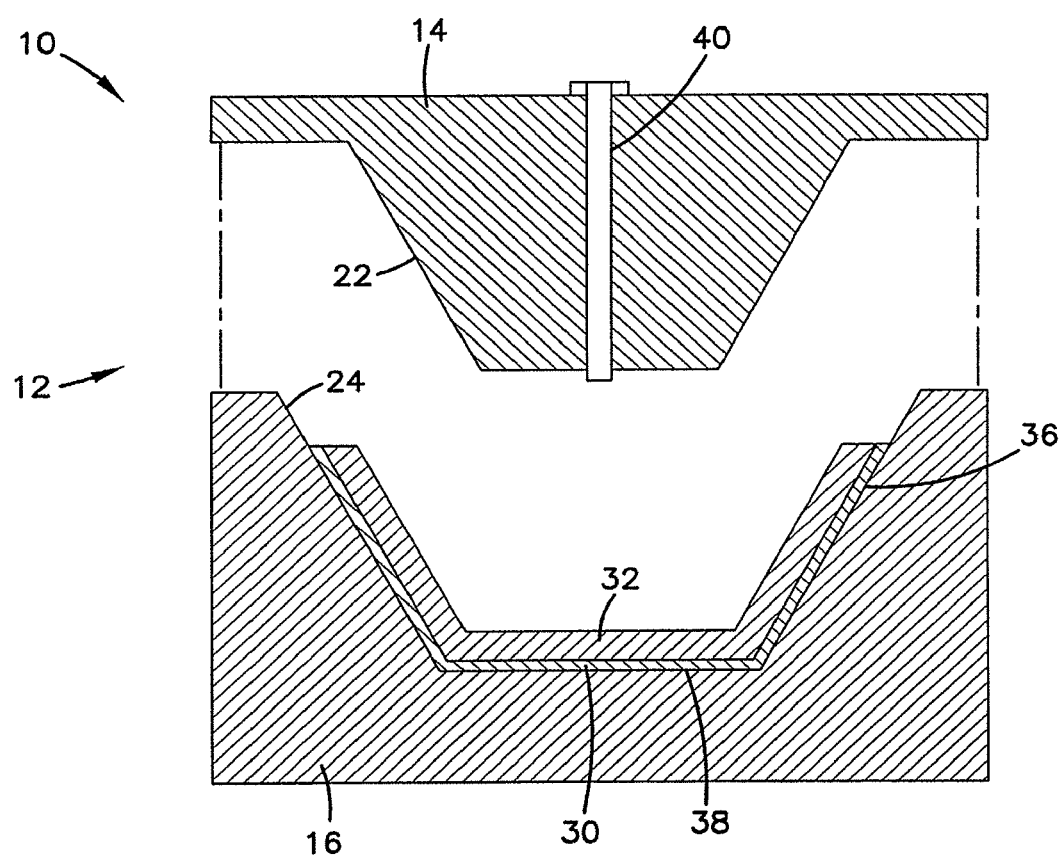
FIG. 1 is a laminate structure of a gel coat and a glass fiber matrix between male and female mold halves.

The invention relates to a method for manufacturing a glass fiber reinforced composite structure impregnated with a cured, thermoset resin, and to a resulting composite structure. The composite structure can be used as a marine component such as a boat hull or a boat deck. Additional exemplary uses of the composite structure include spas, tubs, recreational vehicles, and autobody panels. In general, the composite structure can be applied in various applications where high strength structural members are used.

The method for manufacturing a glass fiber reinforced article according to the invention can be referred to as a modified closed mold process. In a conventional closed mold process for manufacturing a glass fiber reinforced article, panels or plys of glass fiber, sometimes referred to as engineered glass fiber, are loaded into a mold cavity having surfaces that defines the ultimate configuration of the article. Cutting and trimming the engineered glass fiber is typically required in order to cover the surface of the mold cavity and to avoid open spaces and overlap. The complexity of the cutting and trimming typically depends on the shape of the surface of the mold cavity. A mold cavity having curves or non-uniform angles often requires cutting and trimming of the engineered glass fiber. An adhesive is typically used to help hold the engineered glass fiber in place on the mold surface. As an alternative to the use of engineered glass fiber, a preform can be formed on a screen so that the preform has a shape that conforms to the mold cavity. In general, the preform can be provided having a shape the corresponds to the ultimate configuration of the article. The preform can then be allowed to cure, and then moved from the screen to the mold cavity. The second mold half is placed over and encloses the first mold half forming a mold cavity or plenum containing the engineered glass fiber or preform. A flowable resin is then injected into the mold cavity or plenum to impregnate or saturate the engineered glass fiber. After a period of curing, the finished article is removed from the mold plenum. An advantage of the closed mold process is that the VOCs emitted from the flowable resin can be recovered rather than released to the environment.

The applicants have discovered that the closed mold process can be modified so that chopped fiber is applied to the mold surface thereby avoiding the need to place engineered glass fiber (e.g., panels or plys of glass fiber) on the mold surface and avoiding the need to manufacture a preform and then placing the preform in the mold. An advantage of applying chopped glass fiber to the mold surface is that the process is relatively convenient since there is no need to cut and trim panels of engineered glass fiber and there is no need to separately prepare a preform and then move the preform to the mold. In addition, an advantage of applying chopped glass fiber is the ability to control the thickness and coverage of the glass fiber. Furthermore, chopped glass fiber is relatively less expensive than engineered glass fiber, and the time and effort required to cover a mold surface with chopped glass fiber is less relative to the time and effort needed to place engineered glass fiber on a relatively complex shaped mold surface or the time and effort required to manufacture and move a preform.

The applicants discovered that a closed mold process can be modified by applying a mixture of chopped fiber and binder to form a glass fiber matrix. The combination of glass fiber and binder can be applied by spraying, for example, through a chopper gun. Once the desired coverage of glass fiber matrix is provided covering the mold surface, the glass fiber matrix can be enclosed between a first mold half and a second mold half, and a molding fluid can be injected into the mold cavity or plenum containing the glass fiber matrix. The molding fluid can be referred to as an infusion resin and can be characterized as a reactive polymer forming composition that reacts and cures to form a thermoset resin. According to the modified closed mold process according to the invention, VOCs from the molding fluid can be recovered, and release of VOCs to the environment can be reduced compared with the open mold process.

In the context of the described method for manufacturing a glass fiber reinforced article, the reference to applying a glass fiber matrix over a mold surface should be understood to include applying the glass fiber matrix directly to the mold surface, to a gel coat provided on the mold surface, to a barrier coat provided on a gel coat or on the mold surface, or to some other layer provided between the glass fiber matrix and the mold surface. Accordingly, the characterization of applying a glass fiber matrix over a mold surface does not require the application of the glass fiber matrix directly to the mold surface. There may be layers of materials already applied over the mold surface before the glass fiber matrix is applied. If desired, the glass fiber matrix can be applied directly to the mold surface, a gel coat, or a barrier coat, for example. In many applications, it is expected that a gel coat will be applied to the mold surface to provide the resulting article with an outer layer having a desired appearance. Furthermore, a barrier coat is often applied over a gel coat and provides desired barrier properties such as water resistance and solvent resistance.

Figure 2:
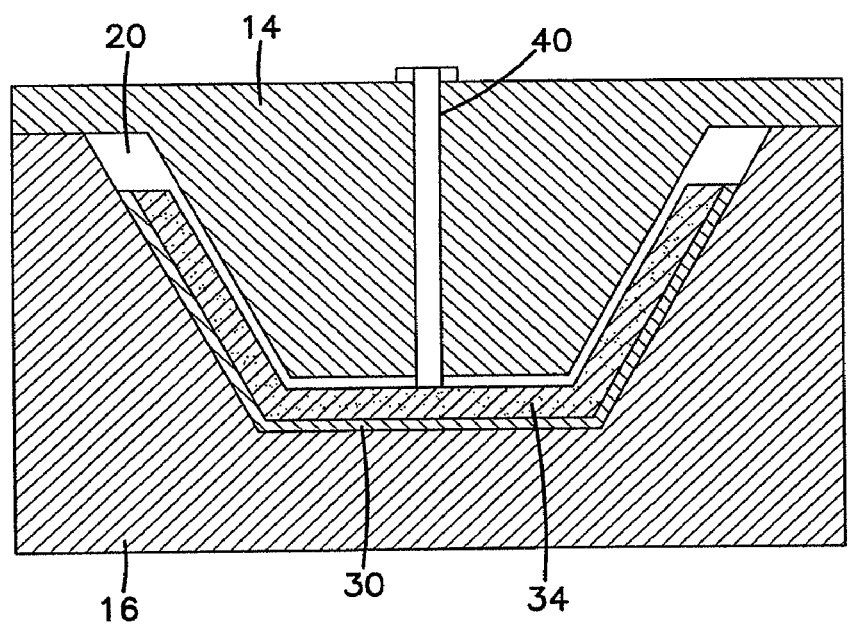
FIG. 2 is a partial cross-section of the molding apparatus shown in FIG. 1 wherein a molding fluid has been injected into the glass fiber matrix.

Referring to FIGS. 1 and 2, a method for manufacturing a glass fiber reinforce article, such as a composite structure, is illustrated utilizing an apparatus 10. The apparatus 10 includes a mold assembly 12 having an upper mold section 14 and a lower mold section 16. The upper mold section 14 can be referred to as the male mold half and the lower mold section 16 can be referred to as the female mold half. When the upper mold section 14 and the lower mold section 16 are coupled together, a cavity or plenum 20 is formed between the upper mold surface 22 and the lower mold surface 24. The upper mold section 14 and the lower mold section 16 can be held together with the aid of pins or latches.

During the formation of the composite structure, a gel coating composition can be applied to the molding surface 26 to form a gel coat 30. The gel coat 30 can form the exterior surface of the composite structure, and can provide a visible cosmetically attractive surface. The gel coat can additionally provide protection against ultraviolet radiation. Over the gel coat 30, a glass fiber matrix 32 can be applied. The glass fiber matrix 32 includes chopped fiber and binder. The binder can be provided as a binder that, when combined with the glass fiber, holds the glass fiber in place once it is applied to the mold, and that does not adversely interfere with the molding resin (e.g., infusion resin) cure process. A preferred binder that can be used can be characterized as a binder that provides adhesive properties at room temperatures. The characterization of a binder that provides adhesive properties at room temperature means that the binder can be mixed with the glass fiber and provide adhesive properties for the glass fiber without the need to separately heat the binder. For example, the binder can provide adhesive properties without heating the binder by using, for example, a flame or other heating source. Accordingly, the glass fiber and binder can be applied at room temperature, and the binder can provide adhesive properties to hold the glass fiber in place. If desired, the binder can be heated to enhance flow or adhesion properties. In addition, the binder can be provided as a reactive binder which means that the binder reacts with the molding fluid or infusion resin that is introduced into the glass fiber matrix 32 and allowed to infuse into the glass fiber matrix 32. The molding fluid or flowable resin that infuses into the glass fiber matrix 32 can be referred to as the infusion resin. The combination of the glass fiber matrix 32 and the infusion resin can be referred to as the impregnated glass fiber matrix. The infusion resin can be allowed to cure to form a cured, thermoset, impregnated glass fiber matrix.

The glass fiber matrix 32 includes a binder to hold the chopped fiber in place on the mold surface 24. It should be understood that the configuration of the mold assembly 12 is provided for illustration, and the lower mold 16 has a molding surface 24 having a relatively vertical surface 36 and a relatively horizontal surface 38. It should be understood that the shape of the molding surface can be more complicated and the relatively vertical surface can be more or less vertical. When applying the glass fiber matrix to the relatively vertical surface, it may be desirable to increase the amount of binder to help hold the chopped fiber in place. Furthermore, when applying the glass fiber matrix to the relatively horizontal surface, it may be desirable to decrease the amount of binder because very little binder is needed to hold the chopped fiber in place on a relatively horizontal surface. Accordingly, one could increase or decrease the ratio of binder to chopped fiber to provide a desired level of adhesion of the chopped fiber in view of the location to which the binder and chopped fiber are applied. By decreasing the amount of binder in those areas where less binder is needed (e.g., horizontal surfaces), it is possible to decrease the amount of binder needed to provide desired adhesion. Reducing the amount of binder can advantageously reduce cost associated with the binder, and it can also reduce VOC admissions as a result of VOCs coming off of the binder. By using less binder, there would be less VOC emission as a result.

The extent of coverage of the glass fiber matrix can be monitored while the glass fiber matrix is applied over the mold surface. If the coverage in certain areas is not sufficient, additional glass fiber matrix can be applied at those locations. Exemplary techniques for measuring the coverage of the glass fiber matrix include the use of a load cell to measure how much fiber is put down, by weight. At various locations, the glass fiber matrix can be compressed and the thickness measured to gauge the amount of glass fiber matrix applied. Furthermore, the process can be computer and robotic operated so that a correct amount of glass fiber matrix is applied based on a predetermined computer program.

Now referring to FIG. 2, where the composite structure is shown between the upper mold section 14 and the lower mold section 16, the molding fluid or infusion resin has been introduced through the one or more injection sprues 40 so that the molding fluid or infusion resin impregnates or saturates the glass fiber matrix 32 to form an impregnated glass fiber matrix 34. The molding fluid or infusion resin reacts to form a thermoset resin, and the binder that is part of the glass fiber matrix 32, when provided as a reactive binder, reacts with the molding fluid so that the binder becomes part of the resulting cured structure. An advantage of having the binder react with the molding fluid or infusion resin is that there is less likelihood that the resulting composite structure will exhibit separation between the glass fiber and the cured resin. Boat hulls, for example, find themselves in an aqueous environment and the water can have a tendency, over time, to cause blistering, separation, or delamination. By providing a binder that reacts with the molding fluid or infusion resin, it is possible to reduce the tendency of blistering, separation, or delamination.

Figure 3:
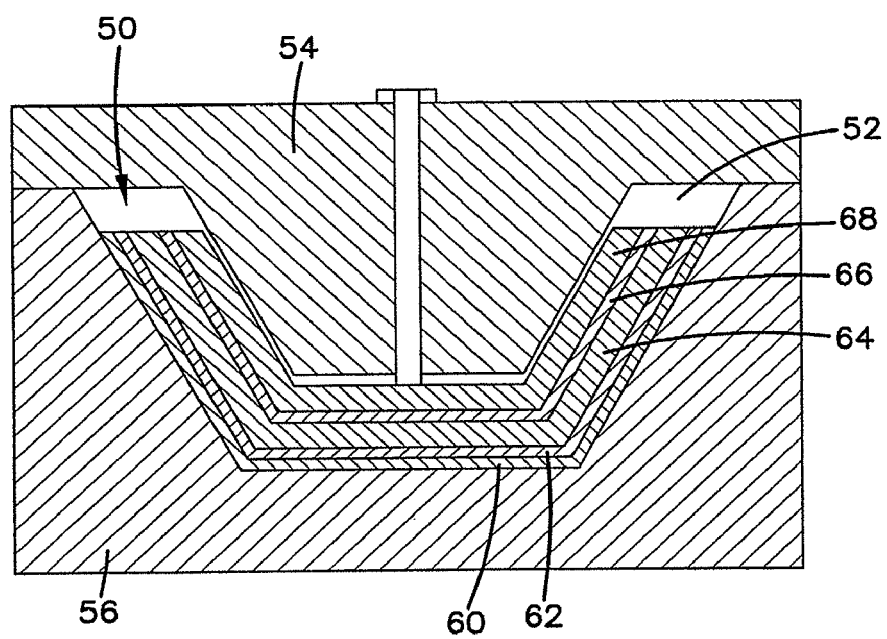
FIG. 3 is a partial cross-section of a molding apparatus showing a laminate structure positioned between male and female mold halves.

Now referring to FIG. 3, an alternative composite structure is shown at reference number 50 provided in the plenum 52 between an upper mold half 54 and a lower mold half 56. The composite structure 50 includes a gel coat 60, a barrier layer 62, a first glass fiber matrix 64, a continuous strand matrix 66, and a second glass fiber matrix 68. The gel coat 60 and the barrier coat 62 can each be considered optional components and, if desired, can be excluded from the composite structure 50. Similarly, the composite structure 50 can be modified so that it includes the combination of the first glass fiber matrix 64, the continuous strand matrix 66, and the second glass fiber matrix 68, or an alternative arrangement that includes, for example, one or more layers of the glass fiber matrix or one or more layers of the continuous strand matrix. Furthermore, the layers can be arranged or ordered as desired. In general, the applicants have found that it may be advantageous to apply layers of the glass fiber matrix to control the thickness of the glass fiber matrix provided covering the mold surface. In addition, it may be desirable to press the glass fiber matrix, for example, by using a roller, to increase the glass fiber density applied as part of the glass fiber matrix. Furthermore, by applying various layers, the various layers can be dried individually so that the weight of the glass fiber can be controlled to help maintain the glass fiber in location within the mold.

Figure 4:
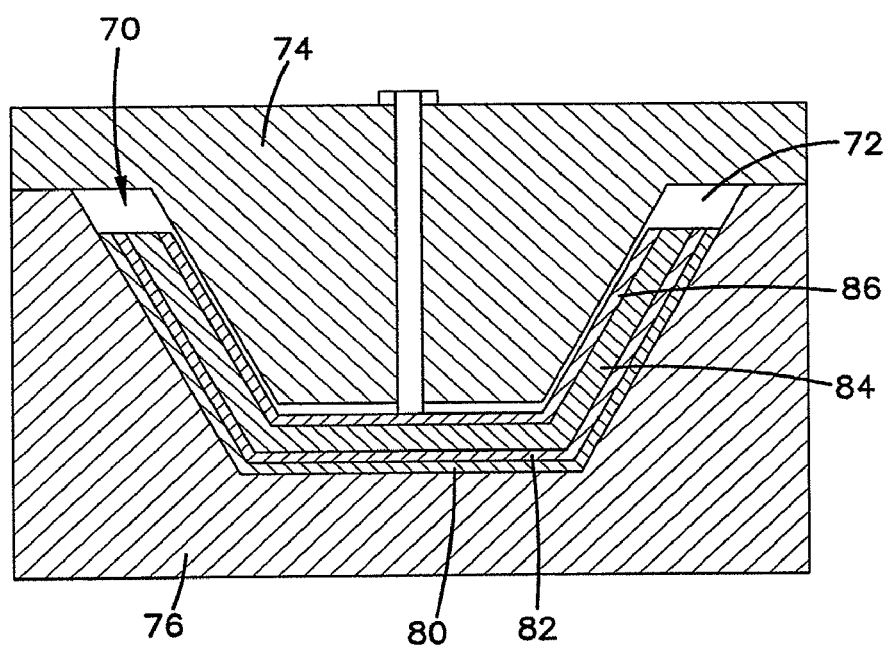
FIG. 4 is a partial cross-section of the molding apparatus showing a laminate structure positioned between male and female mold halves.
Figure 5:
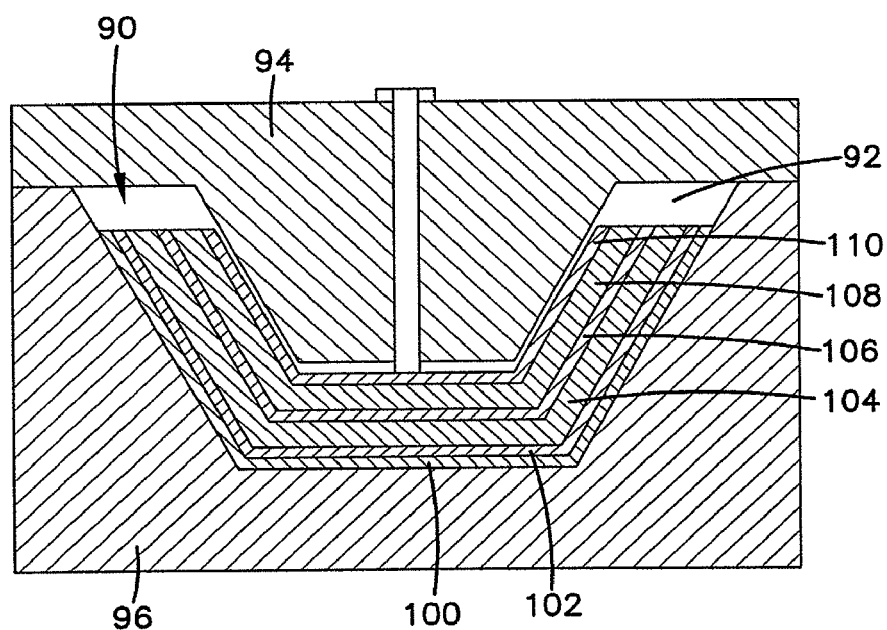
FIG. 5 is a partial cross-section of the molding apparatus showing a laminate structure positioned between male and female mold halves.

Now referring to FIG. 4, and alternative composite structure is shown at reference number 70 provided in the plenum 72 between an upper mold half 74 and a lower mold half 76. The composite structure 70 includes a gel coat 80, a barrier layer 82, a first glass fiber matrix 84, and a continuous strand matrix 86. Another alternative composite structure is shown at reference number 90 in FIG. 5 in the plenum 92 between an upper mold half 94 and a lower mold half 96. The composite structure 90 includes a gel coat 100, a barrier layer 102, a first continuous strand matrix 106, a glass fiber matrix 108, and a second continuous strand matrix 110. It should be understood that the composite structure or glass fiber reinforced article can have, as desired, various multiple layers of the glass fiber matrix and continuous strand fiber.

An advantage of manufacturing a composite structure having alternating layers of glass fiber matrix and continuous strand matrix is the ability to enhance the structural integrity of the composite structure. In addition, alternating glass fiber matrix and continuous strand matrix helps provide for the deposition of a desired amount of the glass fiber matrix without having a single layer of the glass fiber matrix that may be too thick. Furthermore, although the glass fiber matrix contains chopped fiber and binder, the continuous strand matrix can be provided with or without binder, as desired.

The gel coat can be used to provide the composite structure with an exterior surface layer having a visible cosmetically attractive surface. In addition, the gel coat can provide the glass fiber reinforced article with weather resistance. Exemplary gel coat compositions that can be used to form the gel coat include polyester gel coat, polyurethane gel coat, polyurea gel coat, polyester polyurethane gel coat, acrylic gel coat, epoxy gel coat, alkyd gel coat, or mixtures thereof. Exemplary gel coat compositions that can be used include those described in U.S. Pat. No. 6,492,470 to Crump et al., the disclosure of which is incorporated herein by reference. In general, a gel coat composition can be applied to a mold surface in an amount sufficient to provide the exterior surface of the resulting glass fiber reinforced article with a cosmetically attractive surface. In general, the gel coat composition can be applied to the mold surface to provide a cured gel coat having a thickness of about 5 mil to about 50 mil, and preferably about 10 mil to about 20 mil.

A barrier layer can be applied over the gel coat to provide desired barrier properties. For example, it may be desirable for the barrier layer to provide water resistance and blister resistance. Exemplary barrier coat composition that can be used to form a barrier coat or a barrier layer include polyester barrier coat, polyurethane barrier coat, polyurea barrier coat, polyester polyurethane barrier coat, acrylic barrier coat, epoxy barrier coat, alkyd barrier coat, vinyl ester barrier coat, or mixtures thereof. Exemplary barrier coat compositions that can be used include those disclosed by U.S. Pat. No. 6,660,373 to Hsu et al. and U.S. Pat. No. 6,830,804 to Hsu et al., the disclosures of which are incorporated herein by reference. The barrier coat composition can be applied over the gel coat, if a gel coat is present, and allowed to cure to provide a barrier coat. The thickness of the barrier coat composition can be sufficient to provide the resulting glass fiber reinforced article with desired barrier properties, such as, water resistance and blister resistance. When the glass fiber reinforced article includes a barrier coat, it can be included having a thickness of above 5 mil to about 50 mil, and preferably about 10 mil to about 20 mil.

The glass fiber used to form the glass fiber matrix or the continuous strand can include glass fiber that is commonly used in the manufacture of glass fiber reinforced articles. In general, chopped fiber refers to glass fiber that has been cut and applied typically on an air stream using, for example, a chopper gun. The binder can be combined with the chopped fiber to help hold the chopped fiber in place covering the mold surface to provide a desired thickness of glass fiber matrix covering the mold surface. The amount of the binder can be varied depending upon, for example, the relative steepness of the surface to which the glass fiber matrix is to be applied and the thickness of the glass fiber matrix to be applied to the surface. For example, it may be desirable to apply a relatively greater amount of binder when the glass fiber matrix is applied to a more vertical surface compared with applying the glass fiber matrix to a horizontal surface. By way of example, the glass fiber matrix can include glass fiber in an amount of about 80 wt. % by weight to about 98 wt. % by weight, and can include an amount of binder of about 2 wt. % to about 20 wt. %.

The binder can be provided as a reactive binder. In general, a reactive binder refers to a binder that reacts with the molding fluid or infusion resin as the molding fluid or infusion resin reacts to form a thermoset resin. Exemplary binders that can be used include unsaturated polyester resin binders and acrylic urethane binders. An exemplary unsaturated polyester binder is available under the name COR99-216-020 from Interplastic Corporation of Minnesota. In general, the binder available under the name COR99-216-020 is characterized as a copolymerizable polyester based fiberglass tackifier that is useful for holding engineered glass fiber fabric in place for infusion processes. The binder contains methyl ethyl ketone as a solvent. Another binder that can be used is available under the name Nutack 046-4065 from Cook Composites and Polymers Co. of North Kansas City, Mo. The binder available under the name Nutack 046-4065 is characterized as an acrylic urethane and contains styrene monomer and methyl ethyl ketone. Because the binder can contain an organic solvent, it is not necessary to heat the binder in order for the binder to provide adhesive properties to help hold the glass fiber in place. The method for manufacturing a glass fiber reinforced article can take place without heating the binder. Techniques that involve heating a binder in order to provide adhesive properties, such as by an open flame, can be avoided utilizing a binder and organic solvent capable of holding the glass fiber in place as a result of application at room temperature.

The glass fiber matrix can be applied over the gel coat, barrier coat, or both the gel coat and the barrier coat. The glass fiber matrix includes a mixture of chopped glass fiber and binder. In general, the binder can have a viscosity that is sufficiently low so that it can be combined with the glass fiber and sprayed to provide desired coverage. In general, the binder can have a viscosity of about 0.1 cps to about 100 cps at room temperature. In general, an organic solvent can be provided as part of the binder to provide desired coverage of the binder onto the glass fiber. When the binder includes an organic solvent, the organic solvent can be included in the binder in an amount of about 10 wt. % to about 70 wt. %, and preferably about 30 wt. % to about 60 wt. %, to provide desired binder application and coverage properties. The organic solvent is preferably an organic solvent that does not adversely interfere with the infusion resin cure process. An exemplary organic solvent that can be used includes methyl ethyl ketone.

Suitable molding fluids or infusion resins include thermoset resins well known to those skilled in the art and include polyester, vinyl esters, acrylic polymers, polyepoxides, aminoplasts, alkyd resins, polyamides, polyolefins, polyurethanes, vinyl polymers and phenolic resins and mixtures thereof capable of undergoing an irreversible, chemical crosslinking reaction. Non-limiting examples of useful polyester materials include RD-847A polyester resin commercially available from Borden Chemicals of Columbus, Ohio, STYPOL polyester resins commercially available from Cook Composites and Polymers of North Kansas City, Mo., POLYLITE polyester resins with styrene commercially available from Reichold Inc. of Durham, N.C. and NEOXIL polyesters commercially available from DSM B.V. of Como, Italy. Various additives may be incorporated into the resin including curing catalysts, viscosity modifying agents, mold release agents, fillers, pigments, opacifiers and the like. Viscosity modifying agents may include Group II metal oxides or hydroxides and crystalline, hydrogen saturated polyesters. Exemplary molding resins that can be used include those described in U.S. Pat. No. 6,225,380 to Pezron et al. and U.S. Pat. No. 5,296,545 to Heise, the disclosures of which are incorporated herein by reference.

The molding fluid can be injected into the plenum so that the molding fluid mixes with the glass fiber. The glass fiber can be present within the plenum as a result of deposition of one or more layers glass fiber matrix and one or more layers of continuous strand matrix. Whether there is a single layer or multiple layers, the molding fluid can mix with the glass fiber provided within the plenum. The reference to injection should be understood to include both pushing the fluid in by positive pressure and pulling the fluid in by vacuum.

The amount of the molding fluid or infusion resin can be controlled to provide the composite structure with desired physical properties. In general, the composite structure can include about 20 wt. % to about 80 wt. % infusion resin, and can include about 40 wt. % to about 70 wt. % infusion resin. Furthermore, the composite structure can include about 20 wt. % to about 60 wt. % glass fiber, and can include about 30 wt. % to about 50 wt. % glass fiber.

The above specification provides a complete description of the manufacture and use of the glass fiber reinforced article of the present invention. Since many embodiments of the invention can be made without departing from the spirit and scope of the invention, the invention resides in the claims hereinafter appended.

We claim:

1. A method for manufacturing a glass fiber reinforced article, the method comprising:
    (a) spraying a mixture of chopped glass fiber and binder over a mold surface of a first mold section to form a glass fiber matrix, wherein the binder provides adhesive properties at room temperature so that the binder holds the chopped glass fiber in place;
    (b) closing a second mold section over the first mold section to form a plenum between the first mold section and the second mold section, wherein the glass fiber matrix is provided in the plenum between the first mold section and the second mold section;
    (c) injecting a reactive polymer forming composition into the plenum so that the reactive polymer forming composition infuses with the glass fiber matrix; and
    (d) allowing the reactive polymer forming composition and the binder to react and form a thermoset resin, wherein the process does include heating the binder.

2. A method according to claim 1, further comprising a step of applying a gel coat over the mold surface of the first mold section prior to the step of applying a mixture of glass fiber and binder.

3. A method according to claim 2, further comprising a step of applying a barrier coat over the gel coat prior to the step of applying a mixture of glass fiber and binder.

4. A method according to claim 1, wherein the glass fiber reinforced article comprises a boat hull.

5. A method according to claim 1, wherein the glass fiber reinforced article comprises about 20 wt. % to about 80 wt. % of the reactive polymer forming composition.

6. A method according to claim 1, wherein the glass fiber reinforced article comprises about 20 wt. % to about 60 wt. % of the glass fiber.

7. A method according to claim 1, wherein the reactive polymer forming composition comprises an unsaturated polyester forming composition.

8. A method according to claim 1, wherein the reactive polymer forming composition comprises at least one of polyester, vinyl ester, acrylic polymer, polyepoxide, aminoplast, alkyd resin, polyamide, polyolefin, polyurethane, vinyl polymer, phenolic resin, or mixtures thereof.

9. A method according to claim 1, wherein the reactive polymer forming composition comprises at least one of curing catalyst, viscosity modifying agent, mold release agent, filler, pigment, opacifier, or mixture thereof.

10. A method according to claim 1, wherein the binder comprises an unsaturated polyester resin.

11. A method according to claim 1, wherein the binder comprises acrylic urethane.

12. A method according to claim 1, wherein the mixture of glass fiber and binder comprises about 80 wt. % to about 98 wt. % of the glass fiber and about 2 wt. % to about 20 wt. % of the binder.

13. A method according to claim 12, further comprising a step of applying a layer of continuous strand fiber over the mold surface prior to the step of closing a second mold section over the first mold section.

14. A method according to claim 12, further comprising a step of applying a second layer of fiber matrix over the mold surface prior to the step of closing a second mold section over the first mold section.

15. A method according to claim 1, wherein the mixture of chopped glass fiber and binder comprises an organic solvent.

16. A method according to claim 1, wherein the binder has a viscosity of about 0.1 cps to about 100 cps at room temperature.

17. A method according to claim 15, wherein the organic solvent is provided with the binder in an amount of about 10 wt. % to about 70 wt. % organic solvent to combination organic solvent and binder.

18. A method according to claim 15, wherein the organic solvent is provided with the binder in an amount of about 30 wt. % to about 60 wt. % organic solvent to combination organic solvent and binder.

* * * * *